April 7, 1931.　　　　M. S. KELLEY　　　　1,799,376
PARACHUTE AND LAUNCHING APPARATUS THEREFOR
Original Filed June 5, 1928　　2 Sheets-Sheet 2
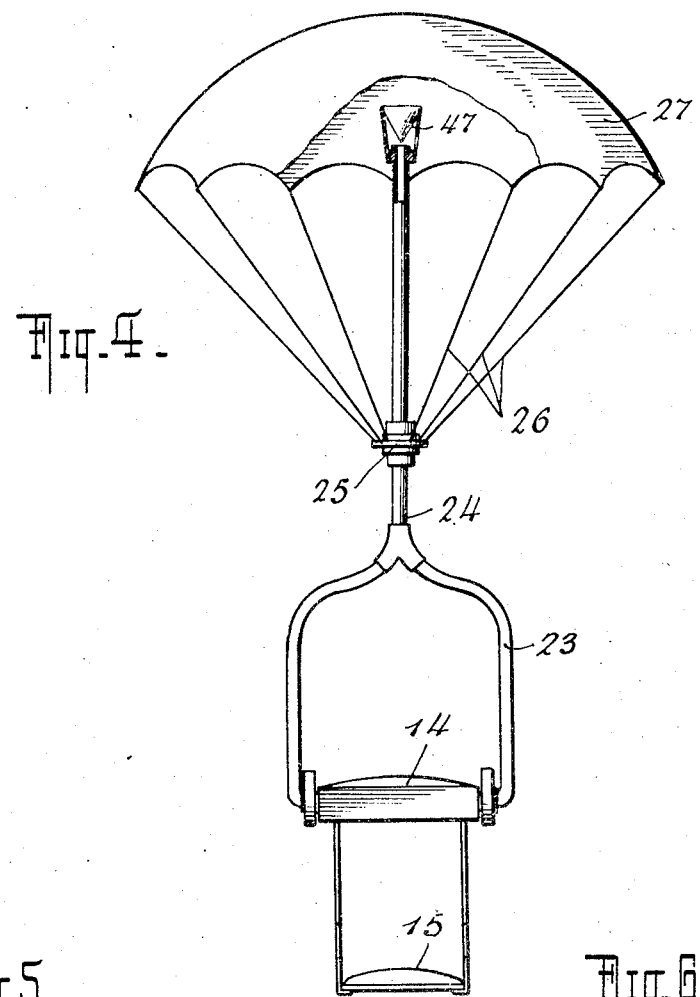
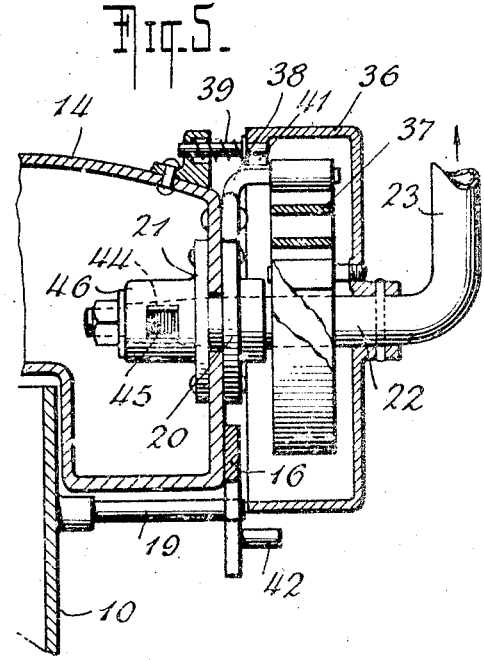
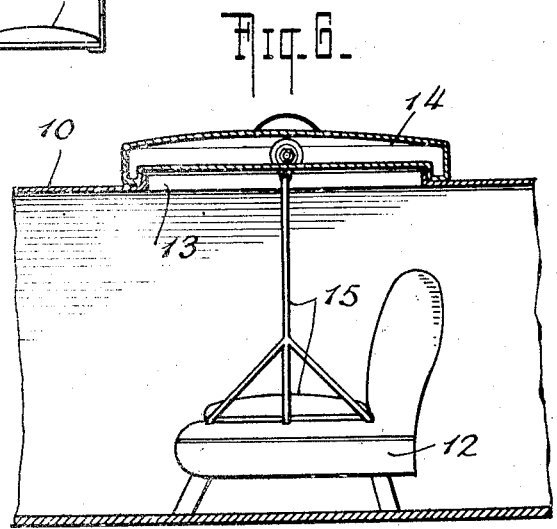
INVENTOR
MATTHEW S. KELLEY
BY Richards & Geier
ATTORNEYS Patented Apr. 7, 1931

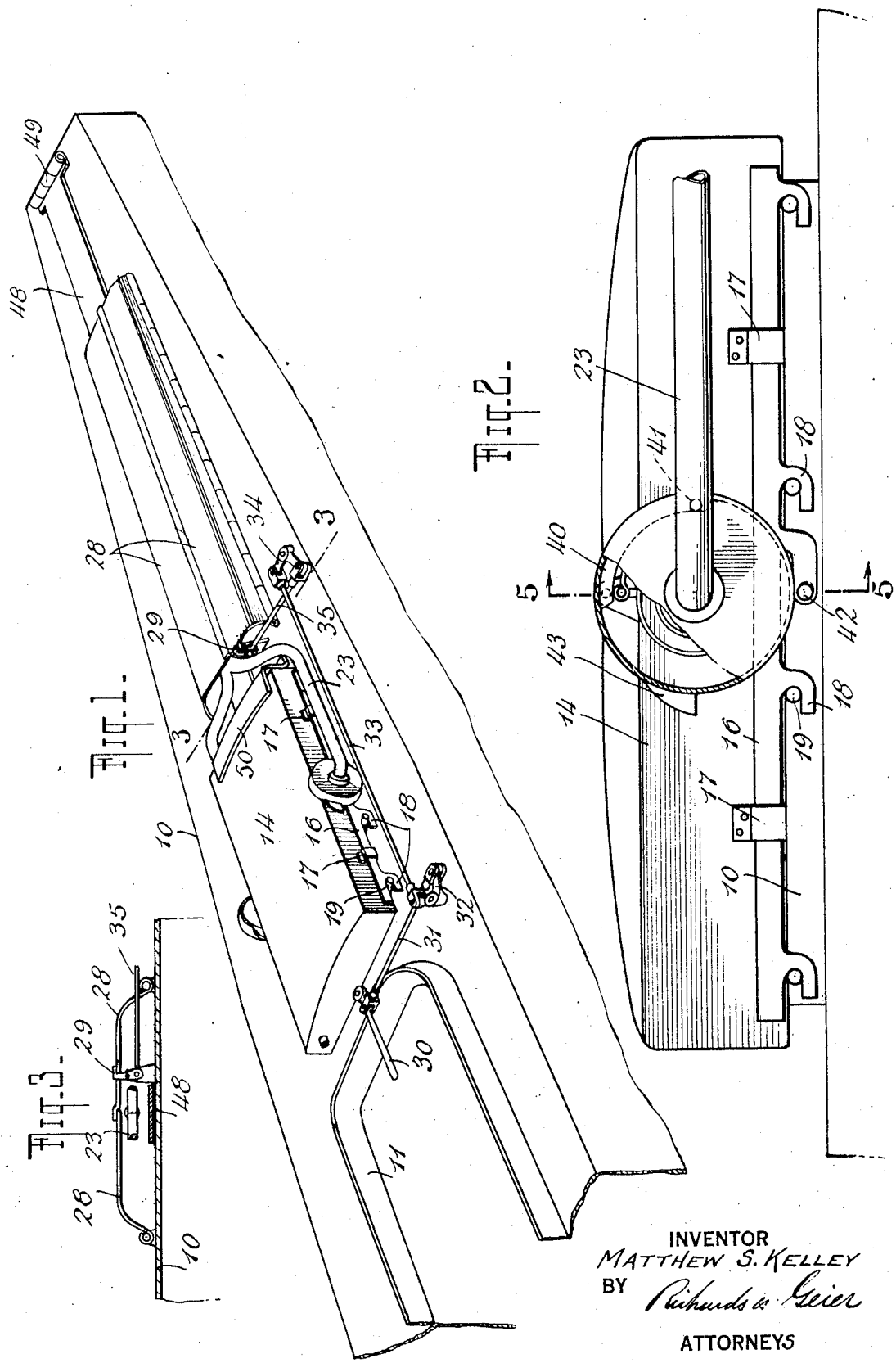

1,799,376

UNITED STATES PATENT OFFICE

MATTHEW S. KELLEY, OF NEW YORK, N. Y.

PARACHUTE AND LAUNCHING APPARATUS THEREFOR

Application filed June 5, 1928, Serial No. 282,986. Renewed January 20, 1931.

This invention relates to improvements in parachutes and launching means therefor, and has for one of its objects to provide an improved equipment designed to be mounted upon the fuselage of an aeroplane in such manner that the parachute may be quickly and effectively released and caused to open to its operative position.

Another object is to attach the parachute body to an air-pressure tank supported upon the fuselage and to provide means capable of moving said parachute relative to the tank, utilizing such relative movement to control the release of the tank from the fuselage and the escape of air from said tank into the parachute body to cause it to open immediately.

Another object is to minimize the possibility of the tail of the aeroplane, when in a nose dive, striking the tank or person supported below the same after release of the tank from the fuselage, but before said tank or person are entirely clear thereof.

The above and other objects will appear more clearly from the following detailed description, when taken in connection with the accompanying drawings, which illustrate a preferred embodiment of the inventive idea.

In the drawings—

Figure 1 is a fragmentary perspective view of the fuselage of an aeroplane, showing the improved parachute equipment applied thereto and in its inoperative position;

Figure 2 is an enlarged fragmentary side elevation of the equipment, partly broken away and shown in section;

Figure 3 is a sectional view substantially on the line 3—3 of Figure 1;

Figure 4 is an elevation of the parachute equipment, partly broken away and shown in section after its release from the fuselage;

Figure 5 is a section on the line 5—5 of Figure 2; and

Figure 6 is a fragmentary longitudinal section through the fuselage showing the position of the compressed air tank upon the fuselage and the seat suspended from said tank.

Referring more particularly to the accompanying drawings, the numeral 10 indicates the fuselage of an aeroplane having the usual cockpit 11 rearwardly of which and within the fuselage is provided a permanent seat 12 for a passenger. Directly above the seat 12 the roof of the fuselage is provided with an opening 13 which is normally closed by a tank 14 adapted to contain compressed air for a purpose presently to appear and which, after launching and in the event of landing in water, will provide a raft to which the passenger may cling until rescued. The tank 14 has suspended therefrom a seat 15 which normally rests upon the seat 12 and in which the passenger seats himself when riding within the fuselage 10. The tank 14 is detachably connected to the fuselage by means of two sliding latch members 16 each mounted in guides 17 on opposite sides of the tank 14 and provided with a plurality of extensions 18 forming slots for receiving pins or rods 19 projecting outwardly from the adjacent side of the fuselage.

On each side of the tank 14 and intermediate the ends thereof the same is provided with exterior and interior bearings 20 and 21 (Figure 5) through which the inturned end 22 of a hollow yoke member 23 extends for pivotal movement within said bearings and relative to the tank 14. The yoke 23 constitutes part of a parachute body-supporting frame 24 to which is connected, at a point adjacent the upper end of the yoke member, a ring 25. This ring has attached thereto the cords 26 of the parachute body 27, which may be of any desired construction and which is normally adapted to be folded, together with the cords 26, about the upper portion of the frame when the parachute is in its inoperative position. In the latter position the frame 24 is extended rearwardly and longitudinally of the fuselage and is held in such position by the covers 28 hinged to the roof thereof and having their free longitudinal edges held together in covering position by a pivoted latch 29 secured to said roof. The latch 29 is released from the cockpit 11 by an operating lever 30 to which is connected one end of a link 31, the other end of which is joined to a bell-crank 32 in turn joined to one end of a connecting rod 33. Another bell-crank 34 is connected to the other end of the rod 33 and this bell-crank is joined to a link 35 connected to the latch 29. Thus, when the lever 30 is actuated the latch 29 is disengaged from one of the covers 28 whereupon said covers will swing open as the frame 24 carrying the folded parachute 27 is moved from its normal position about the tank as a pivot toward the perpendicular position shown in Figure 4.

To automatically effect the movement of the frame 24 to its operative position upon release of the covers 28, each inturned end 22 of the yoke 23 has secured thereto exteriorly of the adjacent side of the tank 14 a casing 36 to which is secured the inner end of a heavy coil spring 37, the outer end of which is fastened to the side of the tank 14 by an arm 38. When the frame 24 is in its normal position the spring 37 is under tension and upon release of the covers 28 said spring will be effective to rotate the casing 36 and consequently the yoke 23 so that the frame will be swung upwardly toward its perpendicular position. In order to stop the frame in this position relative to the tank 14, the latter carries a spring-pressed locking pin 39, the outer end of which normally engages a flange 40 upon the inner edge of the casing 36, but enters an opening 41 in said flange when the yoke 23 has reached the perpendicular position.

At this point in the operation of launching the parachute, the tank 14 is released from the fuselage and simultaneously the compressed air within said tank is permitted to escape through the frame 24 toward the parachute body 27 to immediately open said body. To release the tank the latch member 16 is provided with a pin 42 adapted to be engaged by an abutment 43 carried by the casing 36 and when said pin is struck by said abutment the latch member 16 will be forced to the right, as viewed in Figure 2, thereby disengaging the extensions 18 from the pins 19. At the same time that the tank is released an opening 44 in the inner extremity of each of the inturned ends 22 is registered with an opening 45 in the bushing 46 forming part of the inner bearing 21. With said openings thus aligned the air within the tank 14 is permitted to escape into the hollow frame 24 and passes outwardly therefrom to impinge against a deflector 47 secured to the outer end of the frame adjacent the parachute body 27. The pressure of air escaping from the frame acts immediately to open the body 27 and the frame 24, carrying the tank 14 and seat 15 with a person seated in the latter, is lifted from the fuselage.

Means are provided to avoid the possibility, when the parachute equipment is released, of the tank or person supported thereunder from being struck by any portion of the tail of the aeroplane, as when the same is out of control and nose diving. This means consists of a fender 48 hinged at 49 adjacent the tail of the aeroplane and normally extended forwardly beneath the folded parachute 27, with the free forward end of said fender provided with an angular extension 50 which engages over the rear end of the tank 14. When the tank 14 is released and leaves the fuselage, the extension 50 of the fender remains in engagement with the tank for a short interval until said tank and the person thereunder is clear of the fuselage, the fender then swinging about its pivot toward a perpendicular position relative to the fuselage and, in so doing, maintains the tank at a distance from the tail of the aeroplane. The tank 14 will finally free itself from engagement with the fender as the aeroplane falls away from the parachute.

What is claimed is:

1. In a parachute launching apparatus, a parachute body-supporting frame pivotally and releasably connected to the fuselage of an aeroplane, releasable means for maintaining said frame in an inoperative position on said fuselage, a compressed air storage tank for supplying air to the body of the parachute through said frame, means controlled by a movement of said frame about its pivot, when said releasable means is actuated, to disconnect said frame from said fuselage, and means also controlled by said movement for releasing the air pressure from said tank.

2. In a parachute launching apparatus, a tank releasably connected to the fuselage of an aeroplane, a parachute body-supporting frame pivoted to said tank, releasable means to hold said frame in an inoperative position, means to swing said frame to an operative position when said releasable means is actuated, and means to disconnect said tank from said fuselage upon movement of said frame to its operative position.

3. In a parachute launching apparatus, a tank releasably connected to the fuselage of an aeroplane, a parachute body-supporting frame pivoted to said tank, releasable means to hold said frame in an inopertive position, means to swing said frame to an operative position when said releasable means is actuated, means to disconnect said tank from said fuselage upon movement of said frame to its operative position, and a seat suspended from said tank and located within the fuselage when the tank is connected to the latter.

4. In a parachute launching apparatus, a tank releasably connected to the fuselage of an aeroplane, a parachute body-supporting frame pivoted to said tank, releasable means to hold said frame in an inoperative position, means to swing said frame to an operative position when said releasable means is actuated, means to disconnect said tank from said fuselage upon movement of said frame to its operative position, and a fender pivoted to the fuselage and engageable with said tank for a short interval after its disconnection from the fuselage.

5. In a parachute launching apparatus, a compressed air tank releasably connected to the fuselage of an aeroplane, a parachute body-supporting frame pivoted to said tank, releasable means to hold said frame in an inoperative position, means to swing said frame to an operative position when said releasable means is actuated, means to disconnect said tank from said fuselage upon movement of said frame to its operative position, and means controlled by said movement to allow the escape of air from said tank and through said frame to spread the body of the parachute.

6. In a parachute launching apparatus, a tank releasably connected to the fuselage of an aeroplane, a parachute body-supporting frame pivoted to said tank, releasable means to hold said frame in an inoperative position, a casing secured to said frame, a spring within said casing having one end secured thereto and its other end to said tank and operable upon actuation of said releasable means to swing said frame to an operative position, and means on said casing operable upon movement of said frame to its operative position to actuate said releasable means.

7. In a parachute launching apparatus, a tank releasably connected to the fuselage of an aeroplane, a parachute body-supporting frame pivoted to said tank, releasable means to hold said frame in an inoperative position, a casing secured to said frame, a spring within said casing having one end secured thereto and its other end to said tank and operable upon actuation of said releasable means to swing said frame to an operative position, means on said casing operable upon movement of said frame to its operative position to actuate said releasable means, and means carried by the tank and engageable with said casing to lock said frame in its operative position.

8. In a parachute launching apparatus, a compressed air tank releasably connected to the fuselage of an aeroplane, a hollow parachute body-supporting frame including a yoke having its ends extending into said tank for pivotally connecting the frame thereto, the inner ends of said yoke having openings therein, apertured bushings in which said inner ends are rotatable, means to swing said frame and yoke from a normal to an operative position and to thereby register the openings in said yoke with the apertures in said bushings to permit the escape of air from the tank and through the frame to open the parachute body, and means controlled by the movement of the frame to its operative position to disconnect said tank from said fuselage.

9. In a parachute launching apparatus, a compressed air tank releasably connected to the fuselage of an aeroplane, a hollow parachute body-supporting frame including a yoke having its ends extending into said tank for pivotally connecting the frame thereto, the inner ends of said yoke having openings therein, apertured bushings in which said inner ends are rotatable, means to swing said frame and yoke from a normal to an operative position and to thereby register the openings in said yoke with the apertures in said bushings to permit the escape of air from the tank and through the frame to open the parachute body, a sliding latch member engageable with portions of the fuselage to connect said tank thereto, and means operated by the movement of said frame to its operative position to actuate said latch member to release said tank.

10. In a parachute launching apparatus, a parachute body-supporting frame releasably connected to the fuselage of an aeroplane and having movement relative thereto before being released, means to effect said relative movement, and an air storage tank for supplying air to the body of the parachute through said frame, said tank and frame having openings which are aligned when said frame is released to permit air to flow from the tank into said frame.

In testimony whereof I have affixed my signature.

MATTHEW S. KELLEY.